US012811243B2

(12) United States Patent
Konstantinov et al.

(10) Patent No.: US 12,811,243 B2
(45) Date of Patent: Nov. 24, 2026

(54) BATTERY PACK INCLUDING CAP CONFIGURED TO SUPPORT CARTRIDGE ASSEMBLIES HOLDING AGENTS

(71) Applicant: Ford Global Technologies, LLC, Dearborn, MI (US)

(72) Inventors: Alexey Konstantinov, Dearborn, MI (US); Daniel Paul Roberts, Livonia, MI (US); Francisco Fernandez-Galindo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 750 days.

(21) Appl. No.: 18/593,138

(22) Filed: Mar. 1, 2024

(65) Prior Publication Data

US 2025/0279538 A1 Sep. 4, 2025

(51) Int. Cl.

*H01M 50/383* (2021.01)
*B60L 50/64* (2019.01)
*H01M 50/167* (2021.01)
*H01M 50/178* (2021.01)
(Continued)

(52) U.S. Cl.

CPC ........... *H01M 50/383* (2021.01); *B60L 50/64* (2019.02); *H01M 50/167* (2021.01); *H01M 50/178* (2021.01); *H01M 50/211* (2021.01); *H01M 50/682* (2021.01); *H01M 2200/10* (2013.01); *H01M 2220/20* (2013.01)

(58) Field of Classification Search

CPC ............. H01M 50/383; H01M 50/167; H01M 50/178; H01M 50/211; H01M 50/682; B60L 50/64

See application file for complete search history.

(56) References Cited

U.S. PATENT DOCUMENTS

| | | | | |
|---|---|---|---|---|
| 5,626,982 | A | 5/1997 | Kawai et al. | |
| 6,109,380 | A | 8/2000 | Veenstra | |
| 10,026,942 | B2 * | 7/2018 | Davis | H01M 10/48 |

(Continued)

FOREIGN PATENT DOCUMENTS

| | | | |
|---|---|---|---|
| CN | 202155994 | U | 3/2012 |
| CN | 103796727 | A | 5/2014 |

(Continued)

OTHER PUBLICATIONS

English Machine Translation of KR102203248B1 (Year: 2017).*

*Primary Examiner* — Kourtney R S Carlson
(74) *Attorney, Agent, or Firm* — David B. Kelley; Carlson, Gaskey & Olds, P.C.

(57) ABSTRACT

The techniques described herein relate to a traction battery pack assembly, including an enclosure assembly that provides an interior area and a cell stack within the interior area. The cell stack includes a plurality of battery cells disposed along a cell stack axis. Each battery cell includes at least one terminal tab that projects outward from the cell stack axis. Further included is a cap and a plurality of fingers projecting from the cap. Each of the fingers is spaced-apart from one another to provide at least one slot that receives a portion of the at least one terminal tab. Each of the plurality of fingers is provided by a cartridge assembly. Each of the cartridge assemblies holds agents and is configured to release the agents in response to a thermal event proximate the respective cartridge assembly.

20 Claims, 5 Drawing Sheets

(51) Int. Cl.
*H01M 50/211* (2021.01)
*H01M 50/682* (2021.01)

(56) References Cited

U.S. PATENT DOCUMENTS

| | | | | |
|---|---|---|---|---|
| 11,563,250 | B2 | 1/2023 | Eftekhari et al. | |
| 2011/0236932 | A1 | 9/2011 | Stobbe | |
| 2019/0015774 | A1 | 1/2019 | Tirone et al. | |
| 2019/0221802 | A1 | 7/2019 | Maguire et al. | |
| 2020/0038698 | A1* | 2/2020 | Ryu | H01M 50/581 |
| 2023/0170576 | A1* | 6/2023 | Kim | H01M 50/211<br>429/82 |
| 2024/0405358 | A1* | 12/2024 | Han | H01M 10/659 |

FOREIGN PATENT DOCUMENTS

| | | | | |
|---|---|---|---|---|
| CN | 109353032 | A | 2/2019 | |
| CN | 210384641 | U | 4/2020 | |
| DE | 2635211 | A1 | 2/1977 | |
| DE | 102010036668 | A1 | 2/2012 | |
| EP | 1668650 | B1 | 12/2009 | |
| JP | 2018020097 | A | 2/2018 | |
| JP | 6390062 | B2 | 9/2018 | |
| JP | 2023511845 | A | 3/2023 | |
| KR | 102203248 | B1 * | 1/2021 | H01M 10/613 |
| WO | 2021243834 | A1 | 12/2021 | |

* cited by examiner

Fig-5
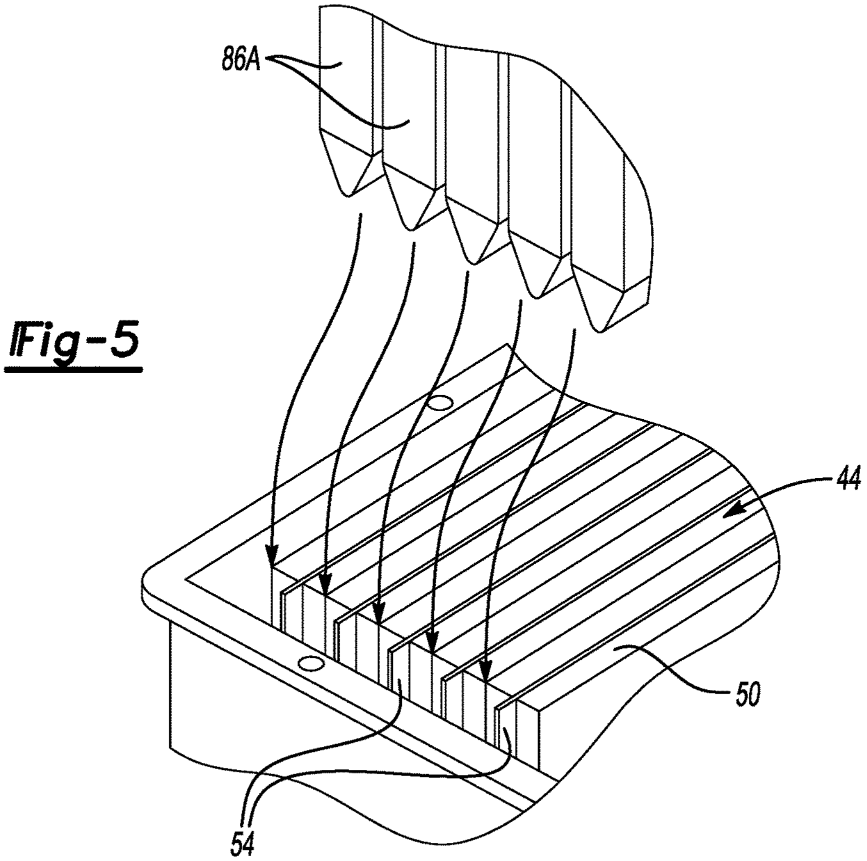
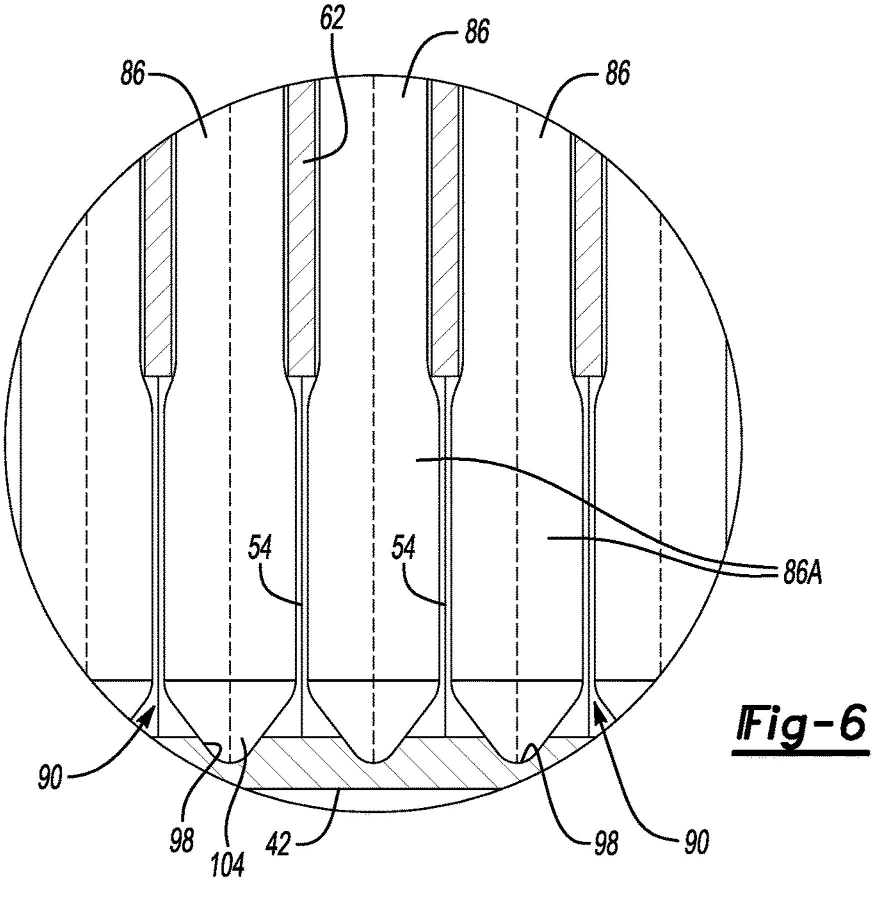
Fig-6

BATTERY PACK INCLUDING CAP CONFIGURED TO SUPPORT CARTRIDGE ASSEMBLIES HOLDING AGENTS

TECHNICAL FIELD

This disclosure relates generally to a traction battery pack for an electrified vehicle. In particular, this disclosure relates to a cap configured to support a plurality of cartridge assemblies relative to the traction battery pack. The cartridge assemblies hold agents, and are configured to release those agents during a thermal event. A corresponding method is also disclosed.

BACKGROUND

A high voltage traction battery pack typically powers the electric machines and other electrical loads of an electrified vehicle. The traction battery pack includes a plurality of battery cells. The traction battery pack can, from time to time, experience a thermal event where one or more of the battery cells vent and expel battery vent byproducts. The battery thermal event may occur due to, for example, over-charging conditions, over-discharging conditions, or other conditions. The vent byproducts can include gases and effluent particles. Thermal energy within the vent byproducts can cause the thermal event to cascade to other battery cells.

SUMMARY

In some aspects, the techniques described herein relate to a traction battery pack assembly, including: an enclosure assembly that provides an interior area; a cell stack within the interior area, wherein the cell stack includes a plurality of battery cells disposed along a cell stack axis, wherein each battery cell within the plurality of battery cells includes at least one terminal tab that projects outward from the cell stack axis; a cap; and a plurality of fingers projecting from the cap, wherein each of the fingers is spaced-apart from one another to provide at least one slot that receives a portion of the at least one terminal tab, wherein each of the plurality of fingers is provided by a cartridge assembly, wherein each of the cartridge assemblies holds agents, and wherein each of the cartridge assemblies is configured to release the agents in response to a thermal event proximate the respective cartridge assembly.

In some aspects, the techniques described herein relate to a traction battery pack assembly, wherein the agents are configured, when released from a respective cartridge assembly, to do one or more of (i) arrest oxygen, (ii) electrically isolate, and (iii) reduce temperature.

In some aspects, the techniques described herein relate to a traction battery pack assembly, wherein each of the cartridge assemblies holds a mixture of silicon dioxide, aluminum oxide, and sodium silicate.

In some aspects, the techniques described herein relate to a traction battery pack assembly, wherein the cap is an integrally-formed structure without any joints or seams.

In some aspects, the techniques described herein relate to a traction battery pack assembly, wherein each of the plurality of fingers is formed separately from one another and formed separately from the cap.

In some aspects, the techniques described herein relate to a traction battery pack assembly, wherein the plurality of fingers includes at least one first finger on a first side of the cell stack, and at least one second finger on an opposite, second side of the cell stack.

In some aspects, the techniques described herein relate to a traction battery pack assembly, wherein the cap is disposed alongside a third side of the cell stack.

In some aspects, the techniques described herein relate to a traction battery pack assembly, wherein the third side is transverse to both the first side and the second side.

In some aspects, the techniques described herein relate to a traction battery pack assembly, wherein each of the cartridge assemblies includes: a hollow tube, and a container cap adjacent an end of the hollow tube opposite the cap.

In some aspects, the techniques described herein relate to a traction battery pack assembly, wherein each of the cartridge assemblies is configured such that melting of either the hollow tube or the container cap releases the agents within the respective cartridge assembly.

In some aspects, the techniques described herein relate to a traction battery pack assembly, wherein: the cap includes a plurality of male components, and each of the hollow tubes includes a female component press-fit relative to a corresponding one of the male components.

In some aspects, the techniques described herein relate to a traction battery pack assembly, wherein the plurality of fingers are a plurality of first fingers disposed along a first side of the cell stack and a plurality of second fingers disposed along a second side of the cell stack.

In some aspects, the techniques described herein relate to a traction battery pack assembly, wherein the cell stack is a first cell stack, and further including at least one second cell stack within the interior area.

In some aspects, the techniques described herein relate to a traction battery pack assembly, wherein the plurality of battery cells are a plurality of pouch-style battery cells, each pouch-style battery cell having a crimped edge that projects outward from the cell stack axis about a circumferential perimeter of the pouch-style battery cell, wherein the at least one slot receives a portion of at least one of the crimped edge.

In some aspects, the techniques described herein relate to a traction battery pack assembly, wherein each of the terminal tabs within the plurality of terminal tabs extends through one of the crimped edges.

In some aspects, the techniques described herein relate to a method, including: placing a cell stack within an interior area of an enclosure of a battery pack; inserting an assembly including a cap and a plurality of fingers into the interior area, wherein each of the fingers is provided by a cartridge assembly, wherein each of the cartridge assemblies holds agents, and wherein each of the cartridge assemblies is configured to release the agents in response to a thermal event proximate the respective cartridge assembly; and during the inserting step, receiving at least one tab terminal of the cell stack within a slot between a first finger of the plurality of fingers and a second finger of the plurality of fingers.

In some aspects, the techniques described herein relate to a method, wherein the agents are configured, when released from a respective cartridge assembly, to do one or more of (i) arrest oxygen, (ii) electrically isolate, and (iii) reduce temperature.

In some aspects, the techniques described herein relate to a method, wherein each of the cartridge assemblies holds a mixture of silicon dioxide, aluminum oxide, and sodium silicate.

In some aspects, the techniques described herein relate to a method, wherein the cap is an integrally-formed structure without any joints or seams.

In some aspects, the techniques described herein relate to a method, wherein the plurality of fingers includes a plurality of fingers on a first side of the cell stack and a plurality of fingers on an opposite, second side of the cell stack.

BRIEF DESCRIPTION OF THE DRAWINGS

FIG. 5 illustrates a perspective view of a corner portion of the battery pack of FIG. 2 as the arrangement including the cap and the plurality of fingers is installed.

FIG. 6 illustrates a close-up view of an area of FIG. 4.

DETAILED DESCRIPTION

This disclosure relates generally to a traction battery pack for an electrified vehicle. In particular, this disclosure relates to a cap configured to support a plurality of cartridge assemblies relative to the traction battery pack. The cartridge assemblies hold agents, and are configured to release those agents during a thermal event. A corresponding method is also disclosed. The arrangement of the cap relative to the cartridge assemblies facilitates assembly and disassembly of the cartridge assemblies relative to the traction battery pack. These and other features are discussed in greater detail in the following paragraphs of this detailed description.

Figure 1:
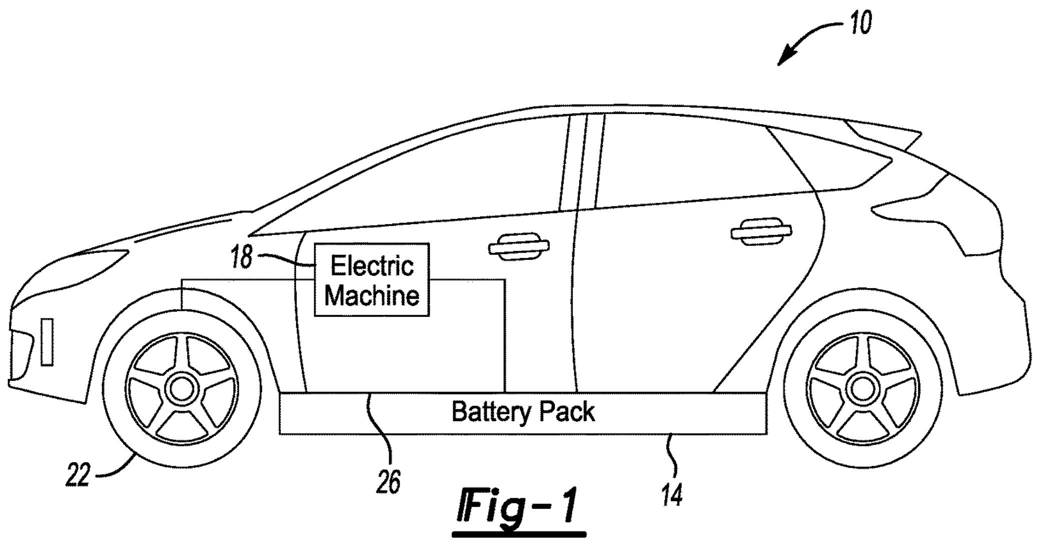
FIG. 1 illustrates a side view of an example electrified vehicle.

With reference to FIG. 1, an electrified vehicle 10 includes a battery pack 14, an electric machine 18, and wheels 22. The battery pack 14 powers an electric machine 18, which can convert electrical power to mechanical power to drive the wheels 22.

The battery pack 14 is, in the exemplary embodiment, secured to an underbody 26 of the electrified vehicle 10. The battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
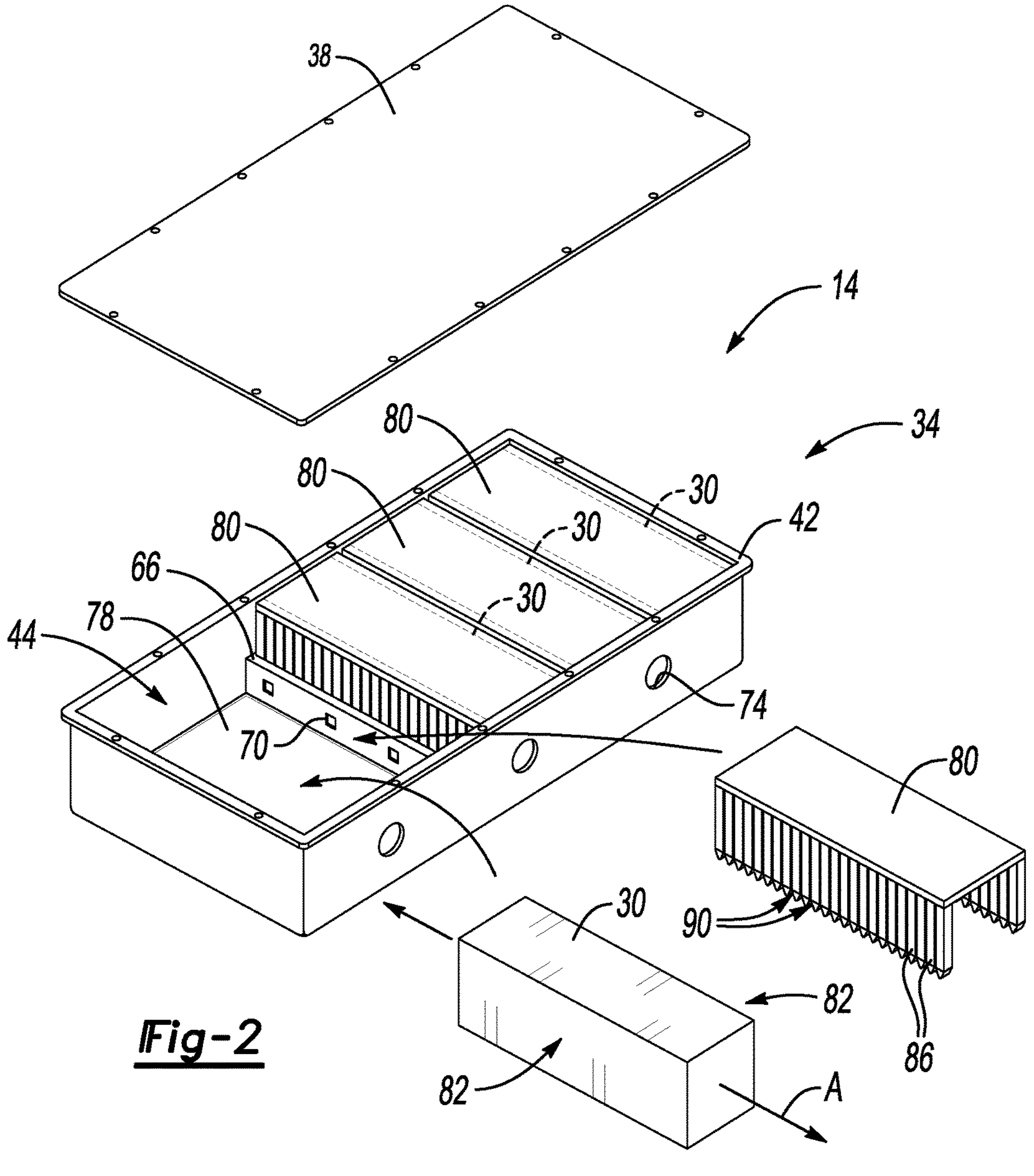
FIG. 2 illustrates an expanded, perspective view of a battery pack from the electrified vehicle of FIG. 1 according to an exemplary aspect of the present disclosure.
Figure 3:
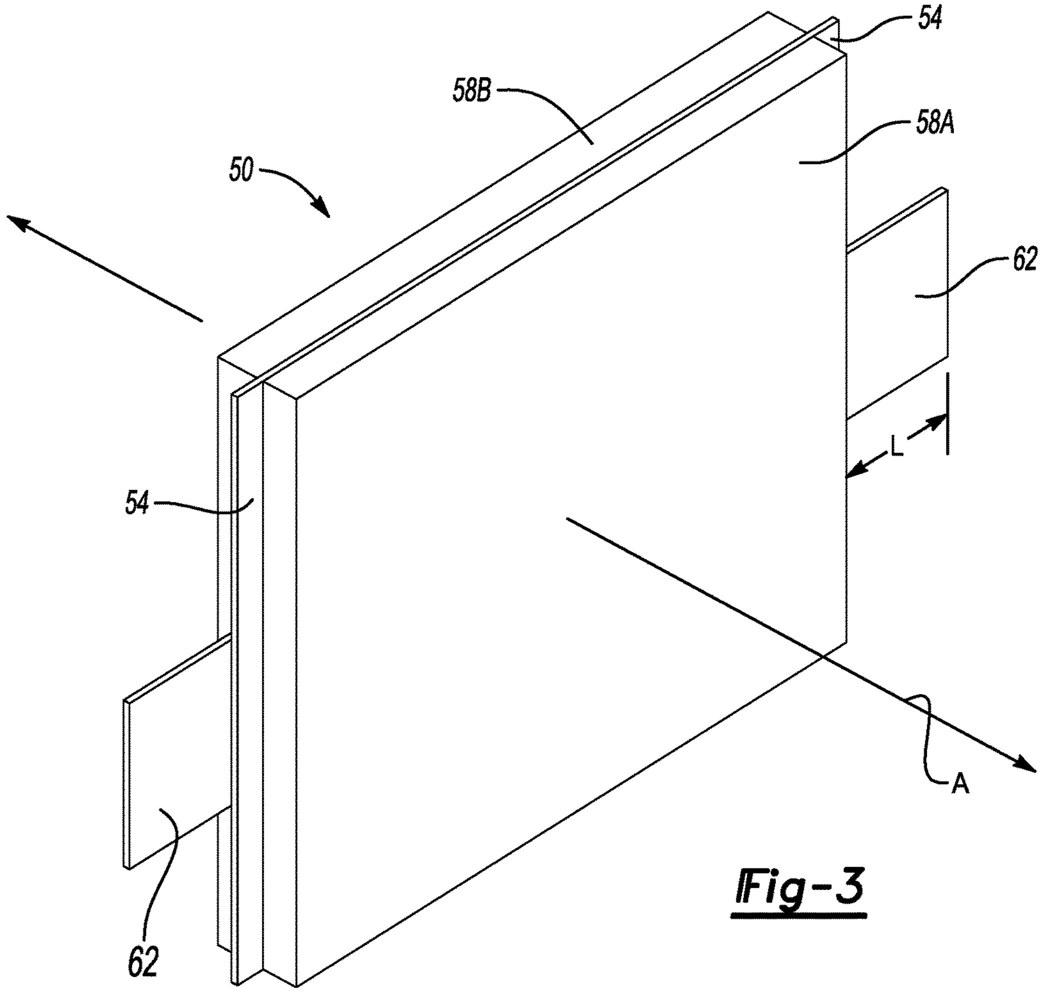
FIG. 3 illustrates a battery cell from the battery pack of FIG. 2.
Figure 4:
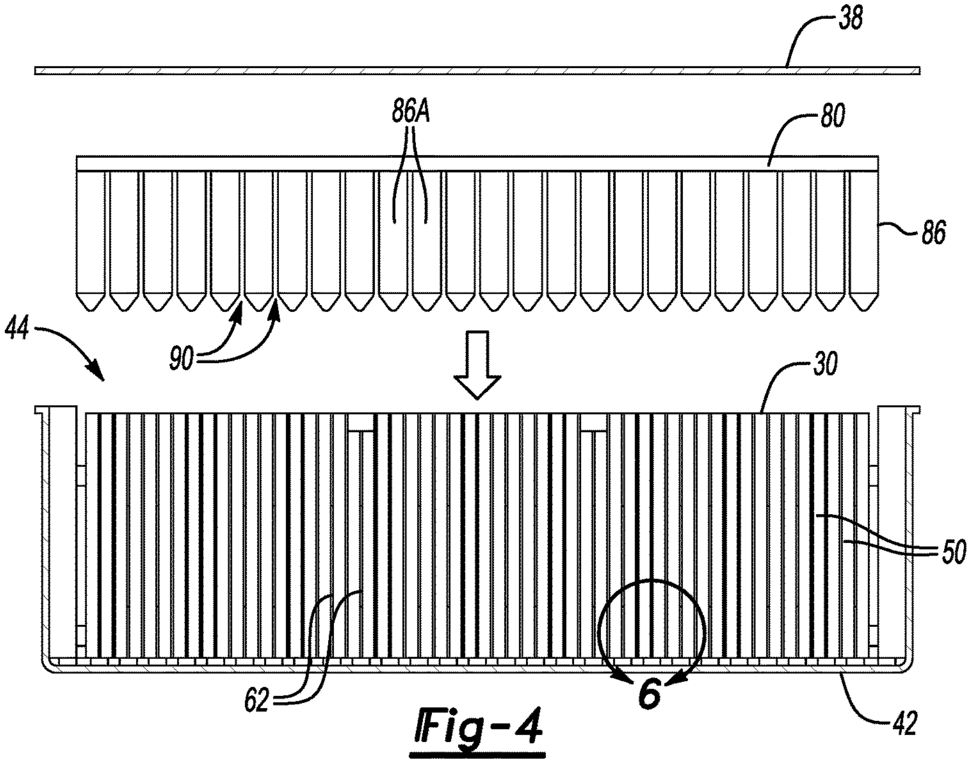
FIG. 4 illustrates a section view of the battery pack of FIG. 2 as an arrangement including a cap and a plurality of fingers is installed.

With reference now to FIGS. 2 and 3, the battery pack 14 includes a plurality of cell stacks 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the cell stacks 30. The enclosure cover 38 can be secured to the enclosure tray 42 using mechanical fasteners (not shown), for example.

Each of the cell stacks 30 includes a plurality of battery cells 50 (or simply, "cells") disposed along a respective cell stack axis A. Within each cell stack 30, the battery cells 50 are stacked side-by-side relative to each other along the cell stack axis A. The cells 50 are shown in highly schematic form in the cell stacks 30 of FIG. 2.

The cells 50 can store and supply electrical power. Although specific numbers of the cell stacks 30 and cells 50 are illustrated in the various figures of this disclosure, the battery pack 14 could include any number of the cell stacks 30 having any number of individual battery cells 50.

In this exemplary embodiment, the battery cells 50 are lithium-ion pouch cells. However, battery cells having other geometries (cylindrical, prismatic, etc.) other chemistries (nickel-metal hydride, lead-acid, etc.), or both could alternatively be utilized within the scope of this disclosure.

The example battery cells 50 include a crimped edge 54 where a first case 58A of the battery cell 50 is joined to a second case 58B of the battery cell 50. The crimped edge 54 can extend partially or completely about a circumferential perimeter of the associated battery cell 50. Terminal tabs 62 of the battery cells 50 project outward away from the cell stack axis A through the crimped edge 54. When the battery cell 50 is within the cell stack 30, the terminal tabs 62 extend outward from the cell stack axis A and can connect to a busbar, for example.

From time to time, pressure and thermal energy within one or more of the battery cells 50 can increase. The pressure and thermal energy increase can be due to an overcharge condition, for example. The pressure and thermal energy increase can cause the associated battery cell 50 to rupture and expel vent byproducts, such as gas and debris, from within the battery cell 50.

The vent byproducts can be released from the associated battery cell 50 through a ruptured area of the associated battery cell 50. The vent byproducts may be released through a ruptured area of the crimped edge 54. The vent byproducts could also be released through a designated vent within the one or both of the first case 58A and the second case 58B. The designated vent could be a membrane that yields in response to increased pressure.

The battery pack 14, in these examples, includes cross-member assemblies 66 disposed between cell stacks 30. The example cross-member assemblies 66 extend longitudinally in a direction that is parallel to the cell stack axes A. The cross-member assemblies 66 and the cell stack axes A extend in a cross-vehicle direction (i.e., from a driver side to a passenger side). Bus bars that connect to the terminal tabs 62 can be mounted to the cross-member assemblies 66.

In this example, the cross-member assemblies 66 could include venting passageways. Vent byproducts from one or more of the battery cells 50 can move through at least one of the openings 70 into the venting passageway. The vent byproducts are communicated though the venting passageway through an enclosure vent 74 to an area outside the battery pack 14. The openings 70, the enclosure vent 74, or both can be covered by respective membranes, for example, when not venting. During venting, the vent byproducts can rupture the membranes so that the vent byproducts can flow from the battery cells 50, through the openings 70 to the venting passageway and then through the enclosure vent 74.

In another example, vent byproducts from one or more of the battery cells 50 is routed through one or move vents in the enclosure cover 38 of the traction battery pack 14. Other methods of conveying vent byproducts from the traction battery pack 14 are possible and come within the scope of this disclosure.

The battery pack 14 includes a plurality of thermal barriers 78 within the interior area 44. The thermal barriers 78 include portions disposed along a bottom of the cell stacks 30, as generally shown in FIG. 2. The thermal barriers 78 block thermal energy from swirling back against other battery cells 50 that are not venting. A thermal barrier 78 is shown relative to a bottom of the interior area 44 in FIG. 2, the thermal barriers 78 could alternatively or additionally be provided adjacent a bottom or a side of the interior area 44, in other examples.

With reference now to FIGS. 4 to 7C, and continuing reference to FIGS. 2 and 3, this disclosure includes an arrangement including a cap 80 and a plurality of fingers 86 spaced-apart from each other to provide a plurality of slots 90. The cap 80 is an integrally-formed structure without any joints or seams, in one example. The cap 80 is made of a metallic material, in one example. The cap 80 is configured to interface with each of the fingers 86. In an example, each of the fingers 86 is configured to be press-fit relative to the cap 80. The fingers 86 are formed separately from the cap 80 and separately from one another.

While the cap 80 is shown separately from the thermal barrier 78, the cap 80 could be provided by the thermal barrier 78, in another embodiment. The thermal barrier 78 may be a plastic insulator of the battery pack 14.

In an embodiment, the fingers 86 are configured to be attached to the cap 80. In that state, the cap 80 and fingers 86 are moveable as an assembly. The cap 80 and fingers 86 can be installed relative to the battery pack 14 as an assembly. When the cap 80 and fingers 86 are installed within the battery pack 14, the slots 90 each receive a portion of one or more of the terminal tabs 62 that extend from one or more of the battery cells 50. The slots 90 additionally receive a portion of the crimped edge 54 from one or more of the battery cells 50.

Figure 7A:
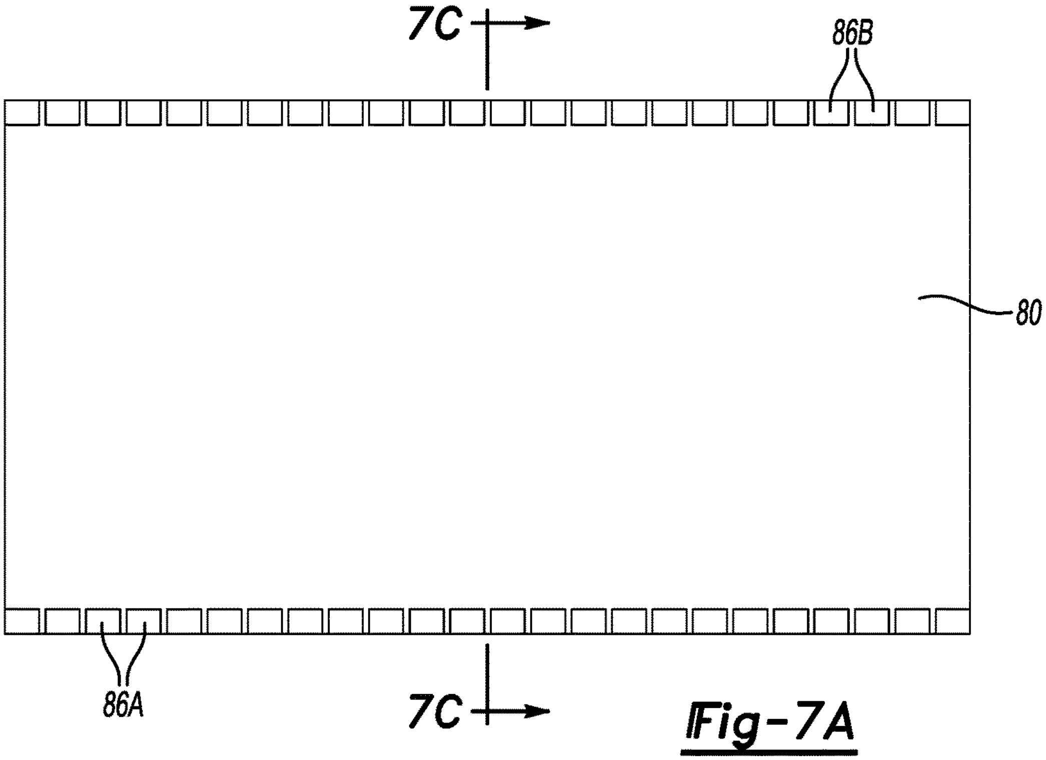
FIGS. 7A to 7C illustrate various views of the arrangement of the cap and the plurality of fingers.
Figure 7B:
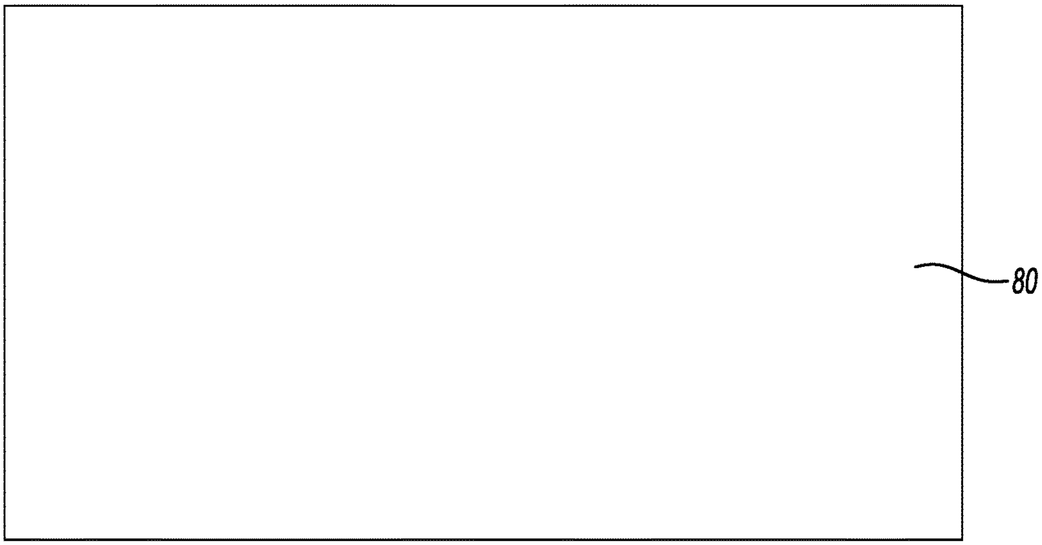
Figure 7C:
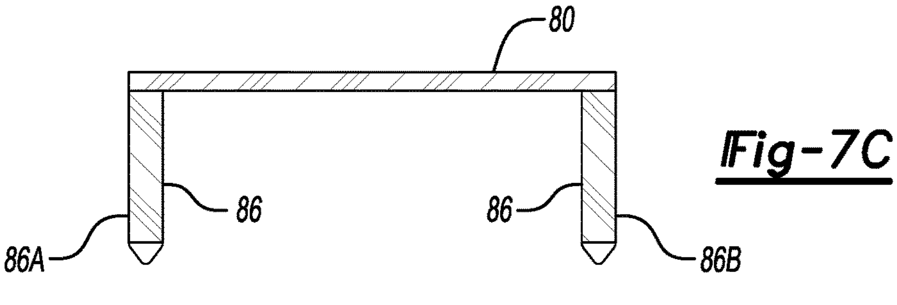

In this example, a plurality of first fingers 86A (FIG. 7A) project from a first side of the cap 80 and a plurality of second fingers 86B project from a second side of the cap 80 opposite the first side. The first fingers 86A can be placed along one of the outboard sides 82 (FIG. 2) of one of the cell stacks 30, and the plurality of second fingers 86B can be placed along an opposing outboard side of that cell stack 30. The plurality of first fingers 86A and the plurality of second fingers 86B each project from the cap 80, which is disposed alongside another side of the cell stack 30—here an upper side of the cell stack 30. The outboard sides 82 are substantially parallel to each other in this example. The third side is transverse, here perpendicular, to the outboard sides 82. A section of the cap 80 taken through the one of the first fingers 86A and one of the second fingers 86B has a substantial "C" shape as shown in FIG. 7C.

Figure 8:
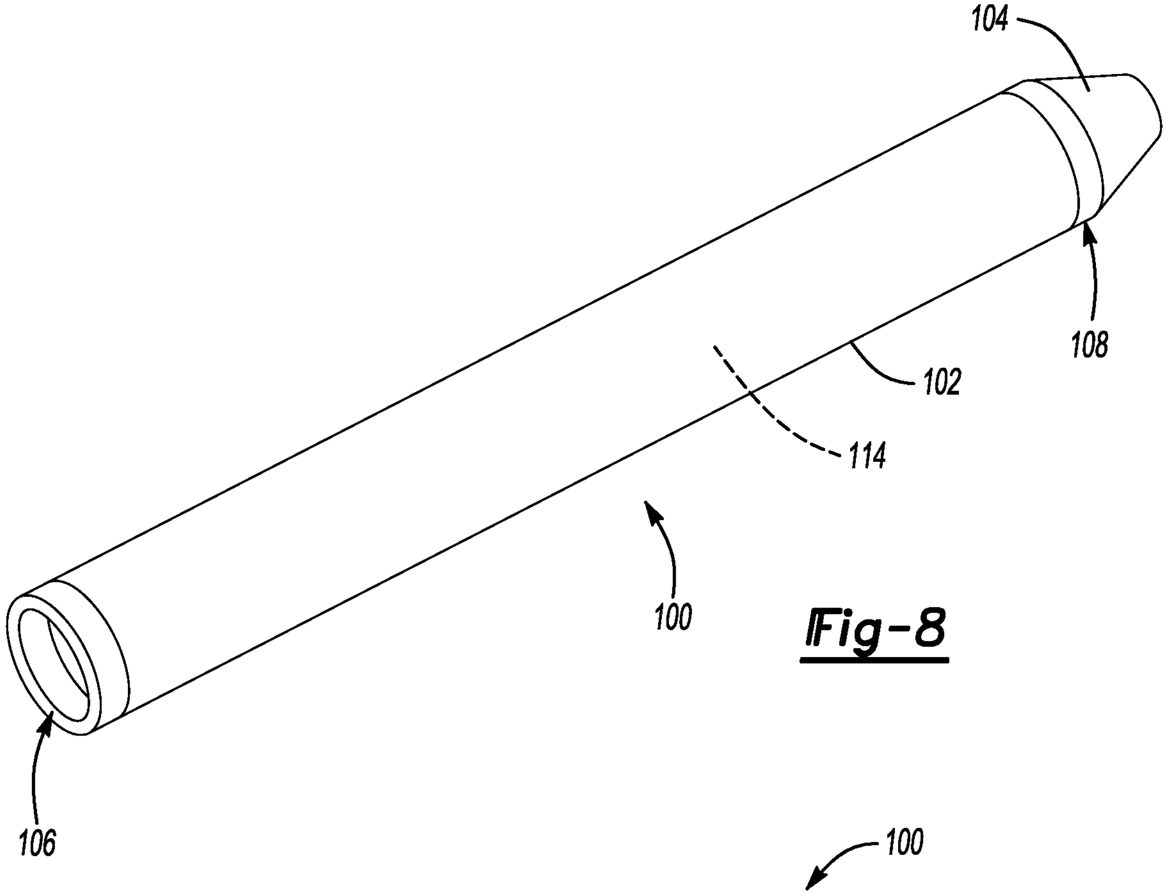
FIG. 8 illustrates an example cartridge assembly.

Each of the first fingers 86A and second fingers 86B are provided by individual cartridge assemblies. An example cartridge assembly 100 is shown in FIG. 8. The cartridge assembly 100 includes a hollow tube 102 and a cartridge cap 104. The hollow tube 102 includes a first end portion 106 configured to interface with the cap 80, and a second end portion 108 attached to the cartridge cap 104.

Figure 9:
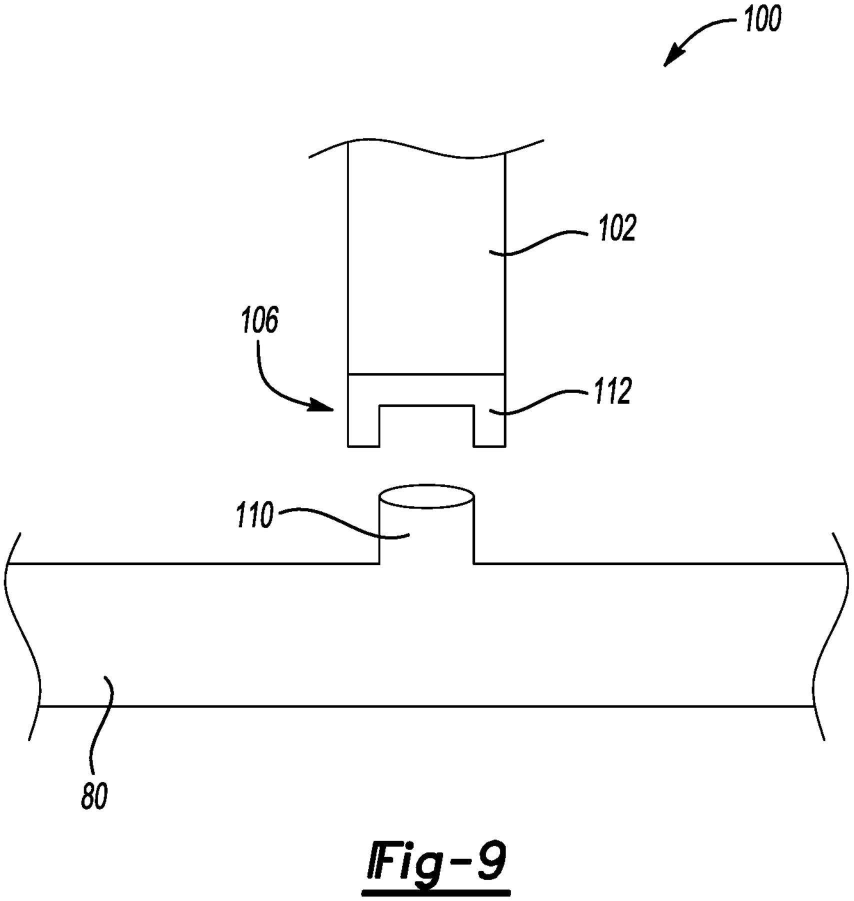
FIG. 9 illustrates an example interface between a cartridge assembly and the cap.

An example interface between the cap 80 and the cartridge assembly 100 is shown in FIG. 9. As shown in FIG. 9, the cap 80 includes a male component 110 configured to interface with a female component 112, which is mounted adjacent the first end portion 106. The male and female components 110, 112 facilitate a press-fit between the cartridge assembly 100 and the cap 80.

In this example, the cartridge cap 104 is tapered leading to its end, which helps to guide the first fingers 86A and second fingers 86B into an installed position.

The enclosure tray 42 can include recessed features 98 (FIG. 6) that each receive part of one of the tapered end portions of the cartridge caps 104. Receiving the tapered end portion of the cartridge cap 104 within the recessed features 98 can help to align and locate the fingers 86 during assembly.

In this example, the hollow tube 102 of each cartridge assembly 100 provides an interior volume. The cartridge assembly 100 holds a agents, namely a mixture of agents 114, within the volume. The mixture of agents can suppress thermal cascades.

The hollow tube 102 and the cartridge cap 104 can be made of materials such as silicone, thermoplastic vulcanisate (TPV), polyethylene, acrylic, or some combination of these. The hollow tube 102, the cartridge cap 104, or both, are designed to melt when exposed to temperatures that, in this example, range from 150 to 250 Celsius. Such temperatures can be present during a thermal event proximate a respective cartridge assembly 100, including when one or more of the battery cells adjacent to the cartridge assembly 100 is venting vent byproducts. Melting the hollow tube 102, the cartridge cap 104, or both, releases the mixture of agents held within the interior volume of the cartridge assembly 100.

The mixture of agents that are released can include endothermic materials and materials that help to electrically isolate. Example materials can include sodium silicate, a ceramic compound, melamine poly (zinc phosphate), aluminum tri-hydrate, and silicon dioxide. Other potential agents could include silica, mica, basalt, aerogels, etc.

The sodium silicate can help to absorb thermal energy. The sodium silicate can be in granular form. The granules of sodium silicate can have a diameter that is from 5 to 100 microns. In an example embodiment, from 25 to 40% of the mixture of agents is sodium silicate.

The ceramic-based compound can include zirconium dioxide, aluminum oxide, and silicon dioxide. The ceramic-based compound can have the form of beads that have a diameter ranging from 2 to 3 millimeters. In the example embodiment, 25 to 40% of the mixture of agents is ceramic-based beads. The ceramic compound can include more than 10% zirconium dioxide, more than 45% with aluminum oxide and more than 40% of silicon dioxide. The aluminum oxide can help to electrically isolate during the thermal event.

In other examples, the ceramic-based compound is 100% silicon dioxide and the zirconium dioxide and aluminum oxide are omitted.

The mixture of agents can include additional aluminum oxide (outside the ceramic-based compound) that acts as a filler agent between the beads of the ceramic based compound. The additional aluminum oxide can be particles having diameters ranging from 5 to 30 microns. The additional aluminum oxide can "fill in the gaps" between larger beads and particles within the mixture of agents. Again, the aluminum oxide can help to electrically isolate during the thermal event. In the example embodiment, 5 to 10% of the mixture of agents is filler aluminum oxide.

The melamine poly (zinc phosphate) can help to generate nitrogen gas to arrest oxygen generated from electrodes during the thermal event. Reducing available oxygen can help to suppress the thermal event. In the example embodiment, 5 to 8% of the mixture of agents is melamine poly (zinc phosphate). The melamine poly (zinc phosphate) can catalyze formation of a layer that supports an effective intumescent effect. The melamine poly (zinc phosphate) can act as a synergist to support suppression of airborne particulates during the thermal event. The melamine poly (zinc phosphate) can act as a heat sink due to endothermal decomposition. The melamine poly (zinc phosphate) can provide electrical isolation during the thermal event particularly with respect to the vent byproducts and surrounding components.

The aluminum tri-hydrate can endothermically react during the thermal event to help to reduce temperatures during the thermal event, particularly temperatures of the vent byproducts. In an example embodiment, 3 to 5% of the mixture of agents is aluminum tri-hydrate.

In other examples, the aluminum tri-hydrate is omitted from the mixture of agents and is not included within the cartridge assembly 100.

In an example, the mixture of agents having silicon dioxide, aluminum oxide, and sodium silicate, beads of the silicon dioxide are significantly larger than the particles of aluminum oxide and sodium silicate.

The mixture of agents is released from one or more of the cartridge assemblies in response to the thermal event.

A shape of the container hollow tube 102 can be cylindrical, rectangular, and/or spherical. The cartridge assemblies 100 can, in some examples, after melting, block movement of vent byproducts to help reduce thermal propagation within the battery pack 14.

The mixture of ages slows thermal propagation between cells, enhances electrical isolation, lowers vent gas temperatures, and suppresses the thermal event by reducing available oxygen.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A traction battery pack assembly, comprising:
an enclosure assembly that provides an interior area;
a cell stack within the interior area, wherein the cell stack includes a plurality of battery cells disposed along a cell stack axis, wherein each of the plurality of battery cells includes at least one terminal tab that projects outward from the cell stack axis;
a cap; and
a plurality of fingers projecting from the cap, wherein each of the fingers is spaced-apart from one another to provide at least one slot that receives a portion of the at least one terminal tab, wherein each of the plurality of fingers is provided by a cartridge assembly, wherein each of the cartridge assemblies holds agents, and wherein each of the cartridge assemblies is configured to release the agents in response to a thermal event proximate the respective cartridge assembly.

2. The traction battery pack assembly as recited in claim 1, wherein the agents are configured, when released from a respective cartridge assembly, to do one or more of (i) arrest oxygen, (ii) electrically isolate, and (iii) reduce temperature.

3. The traction battery pack assembly as recited in claim 2, wherein each of the cartridge assemblies holds a mixture of silicon dioxide, aluminum oxide, and sodium silicate.

4. The traction battery pack assembly as recited in claim 1, wherein the cap is an integrally-formed structure without any joints or seams.

5. The traction battery pack assembly as recited in claim 1, wherein each of the plurality of fingers is formed separately from one another and formed separately from the cap.

6. The traction battery pack assembly as recited in claim 1, wherein the plurality of fingers includes at least one first finger on a first side of the cell stack, and at least one second finger on an opposite, second side of the cell stack.

7. The traction battery pack assembly as recited in claim 6, wherein the cap is disposed alongside a third side of the cell stack.

8. The traction battery pack assembly as recited in claim 7, wherein the third side is transverse to both the first side and the second side.

9. The traction battery pack assembly as recited in claim 1, wherein each of the cartridge assemblies includes:
a hollow tube, and
a container cap adjacent an end of the hollow tube opposite the cap.

10. The traction battery pack assembly as recited in claim 9, wherein each of the cartridge assemblies is configured such that melting of either the hollow tube or the container cap releases the agents within the respective cartridge assembly.

11. The traction battery pack assembly as recited in claim 10, wherein:
the cap includes a plurality of male components, and
each of the hollow tubes includes a female component press-fit relative to a corresponding one of the male components.

12. The traction battery pack assembly as recited in claim 1, wherein the plurality of fingers are a plurality of first fingers disposed along a first side of the cell stack and a plurality of second fingers disposed along a second side of the cell stack.

13. The traction battery pack assembly as recited in claim 1, wherein the cell stack is a first cell stack, and further comprising at least one second cell stack within the interior area.

14. The traction battery pack assembly as recited in claim 1, wherein the plurality of battery cells are a plurality of pouch-style battery cells, each pouch-style battery cell having a crimped edge that projects outward from the cell stack axis about a circumferential perimeter of the pouch-style battery cell, wherein the at least one slot receives a portion of at least one of the crimped edge.

15. The traction battery pack assembly of claim 14, wherein each of the terminal tabs within the plurality of terminal tabs extends through one of the crimped edges.

16. A method, comprising:

placing a cell stack within an interior area of an enclosure of a battery pack;

inserting an assembly including a cap and a plurality of fingers into the interior area, wherein each of the fingers is provided by a cartridge assembly, wherein each of the cartridge assemblies holds agents, and wherein each of the cartridge assemblies is configured to release the agents in response to a thermal event proximate the respective cartridge assembly; and during the inserting step, receiving at least one tab terminal of the cell stack within a slot between a first finger of the plurality of fingers and a second finger of the plurality of fingers.

17. The method as recited in claim 16, wherein the agents are configured, when released from a respective cartridge assembly, to do one or more of (i) arrest oxygen, (ii) electrically isolate, and (iii) reduce temperature.

18. The method as recited in claim 17, wherein each of the cartridge assemblies holds a mixture of silicon dioxide, aluminum oxide, and sodium silicate.

19. The method as recited in claim 16, wherein the cap is an integrally-formed structure without any joints or seams.

20. The method as recited in claim 16, wherein the plurality of fingers includes a plurality of fingers on a first side of the cell stack and a plurality of fingers on an opposite, second side of the cell stack.

* * * * *